(No Model.)
J. BOLTON.
SHUTTLE OPERATING MECHANISM FOR SEWING MACHINES.
No. 484,400. Patented Oct. 18, 1892.
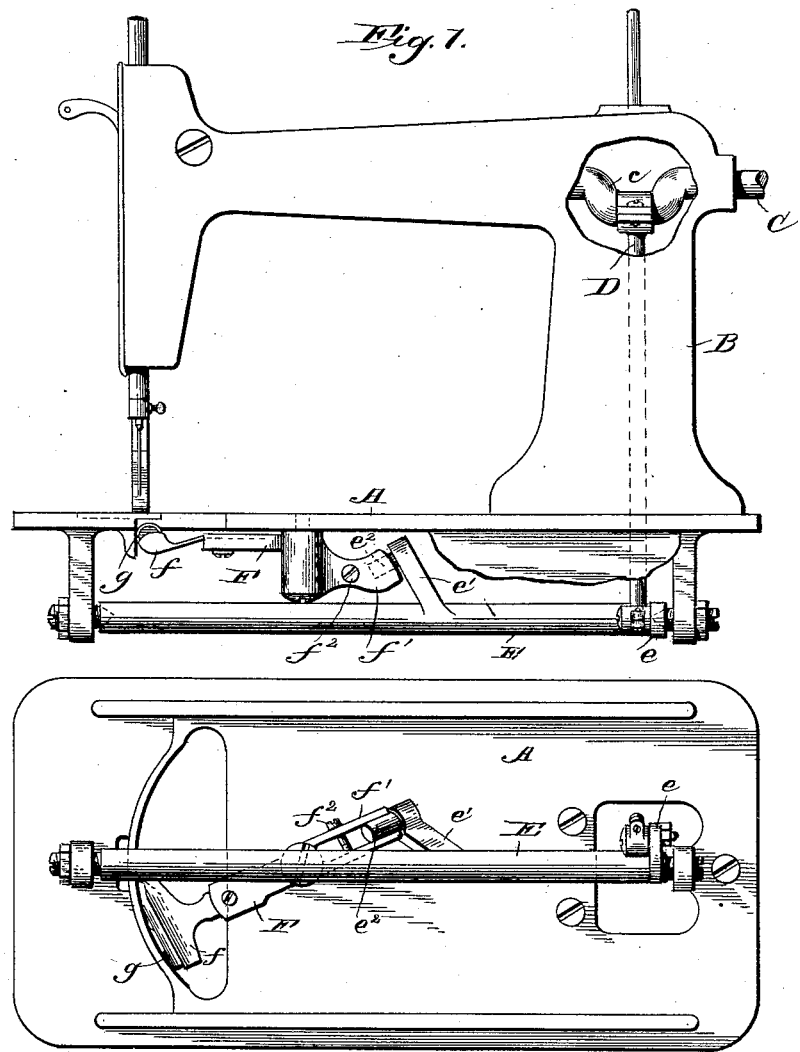

UNITED STATES PATENT OFFICE.

JAMES BOLTON, OF CHICAGO, ILLINOIS.

SHUTTLE-OPERATING MECHANISM FOR SEWING-MACHINES.

SPECIFICATION forming part of Letters Patent No. 484,400, dated October 18, 1892.

Application filed February 29, 1892. Serial No. 423,143. (No model.)

*To all whom it may concern:*

Be it known that I, JAMES BOLTON, a citizen of the United States, residing at Chicago, in the county of Cook and State of Illinois, have invented certain new and useful Improvements in Shuttle-Operating Mechanism for Sewing Machines, of which the following is a specification, reference being had therein to the accompanying drawings.

My invention relates to that class of sewing-machines in which a vibrating shuttle-carrier is employed; and the object of my invention is to provide a shuttle-operating mechanism embodying a comparatively-short horizontally-vibrating shuttle-lever which may be operated from a rocking shaft in such a way that the movement thereof will be strong and positive at all times and which will afford proper facilities for compensating for wear. To this end my shuttle-carrying lever, which is pivoted between its ends, is provided rearward of its pivot with a yoke embracing a stud on an inclined crank-arm attached to a rock-shaft, the said stud being at a right angle to the said arm and the yoke being of such dimensions that whatever may be the position of the stud the latter will be in full contact with both of the inner faces of the yoke.

In the accompanying drawings, Figure 1 is a side view of a sewing-machine embodying my invention, and Fig. 2 is a bottom view thereof.

A denotes the bed-plate, and B the bracket-arm, of a sewing-machine of any suitable construction. Journaled in the upper part of the bracket-arm B is the main rotating driving-shaft C, provided with a crank or eccentric $c$, which is connected by a pitman D with an arm $e$ on the rear end of a rock-shaft E, supported in suitable hangers beneath the bed-plate A. The shaft E is provided about midway of its length with an inclined crank-arm $e'$, having a pin or roller-stud $e^2$ projecting from said arm at a right angle thereto.

F denotes a short shuttle-lever pivoted between its ends and provided at its forward end with a shuttle-carrier $f$ of proper shape to sustain and carry a cylindrical shuttle $g$.

The shuttle-lever F has at its rear end a yoke $f'$, which embraces the stud $e^2$ on the crank-arm $e'$, said yoke being of such dimensions vertically that the said stud will be in full contact with both the inner faces thereof, whatever may be the position of the rock-shaft. It will be apparent from Fig. 2 that the inner faces of the yoke will be in parallel contact with the stud $e^2$ whatever may be the position of the parts, so that the bearing between the yoke and stud will be a strong and positive one, which will insure a strong and positive movement of the shuttle-lever at all times. Any wear which may occur between the inner faces of the yoke $f'$ and the stud $e^2$ may be compensated for by means of a set-screw $f^2$.

By employing a short shuttle-carrying lever pivoted between its ends, as shown, the vibration or jar of the machine incidental to the use of a vibrating shuttle-lever is reduced to a minimum, and by means of the inclined crank-arm shown I am enabled to impart strong and positive movements to the shuttle-lever from the rock-shaft. By arranging the said inclined crank-arm on the upper side of the rock-shaft I secure compactness of parts, as the shuttle-lever is thus brought nearer to the bed-plate of the machine than it would be if the said crank-arm were otherwise arranged.

From the foregoing it will be apparent that when the shaft C is set in motion a rocking movement will be imparted to the shaft E from the crank $c$ through the pitman D, and this rocking movement of the shaft E will result in the proper vibrating movement of the shuttle-lever to operate the shuttle.

Having thus described my invention, I claim and desire to secure by Letters Patent—

1. In a sewing-machine, the combination, with a rotating driving-shaft provided with a suitable crank or eccentric, of a rocking shaft arranged beneath the work-plate of the machine and provided with an operating-arm, and an inclined crank-arm provided with a pin or stud projecting therefrom at a right angle thereto, a pitman connecting the said crank or eccentric with the operating-arm of the rocking shaft, and a vibrating shuttle-carrying lever pivoted between its ends and having rearward of its fulcrum a yoke embracing the said pin or stud on the inclined crank-arm.

2. In a sewing-machine, the combination, with the rotating driving-shaft C, provided with the crank $c$, of the rock-shaft E, pivoted beneath the work-plate of the machine and provided about midway of its length with an inclined crank-arm projecting from the upper side thereof and having a pin or stud extending therefrom at a right angle thereto, said rock-shaft being provided at its rear end with an operating-arm, a pitman connecting the said crank with the said operating-arm, and a shuttle-lever pivoted between its ends and provided rearward of its pivot with a yoke embracing the said pin or stud of the said inclined crank-arm.

In testimony whereof I affix my signature in presence of two witnesses.

JAMES BOLTON.

Witnesses:
T. M. CONPROPST,
F. S. FOUSE.